F. SMITH.
NUT LOCK.
APPLICATION FILED AUG. 7, 1912.
1,072,666.
Patented Sept. 9, 1913.
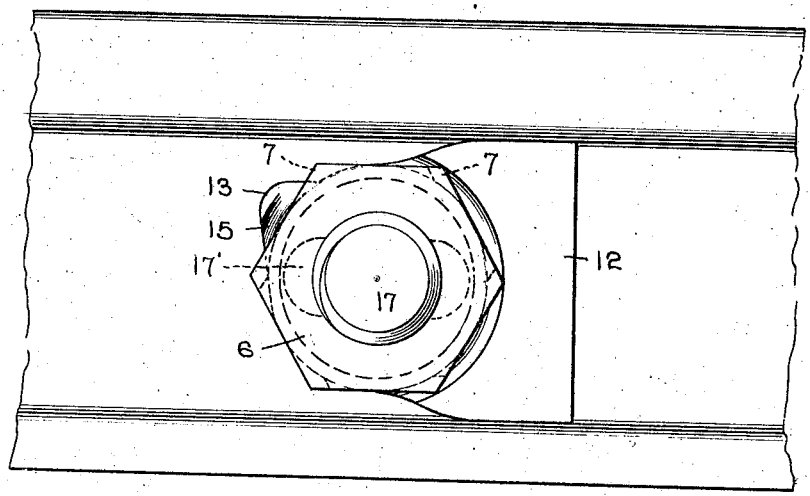

UNITED STATES PATENT OFFICE.

FRANK SMITH, OF QUICK, WEST VIRGINIA.

NUT-LOCK.

1,072,666.　　　　Specification of Letters Patent.　　Patented Sept. 9, 1913.

Application filed August 7, 1912. Serial No. 713,812.

*To all whom it may concern:*

Be it known that I, FRANK SMITH, a citizen of the United States, residing at Quick, in the county of Kanawha and State of West Virginia, have invented certain new and useful Improvements in Nut-Locks; and I do hereby declare the following to be a full, clear, and exact description of the invention, such as will enable others skilled in the art to which it appertains to make and use the same.

My invention relates to improvements in nut locks.

The object of my invention is to provide a nut lock particularly adapted for use in locking fish plates to the ends of railroad rails.

Other objects and advantages will be hereinafter made fully apparent in the specifications and pointed out in the claims.

In the accompanying drawings I have shown the preferred form which my invention may take.

In said drawings, Figure 1 is an elevation showing my improved form of nut lock secured in position upon a rail. Fig. 2 is an elevation view of my improved lock nut, viewed from the opposite side from that which is shown in Fig. 1. Fig. 3 is a view of the nut, at right angles to Fig. 2. Fig. 4 is an elevation showing the form of washer employed in connection with the nut. Fig. 5 is a top plan view of the washer and anchor plate, and Fig. 6 is a sectional view taken on the line 6—6 of Fig. 4.

Referring to the drawings by numerals of reference, similar numerals designating corresponding parts throughout the several views, 6 is a nut, which as shown, is hexagonal in form and substantially of the usual form. The lower face of the nut is provided at each corner with a locking dog 7.

As shown in the drawing the nut employed by me is intended to be turned in a clockwise direction upon a bolt and the outer surface 8 of the dog 7 is inclined from the face of the nut in a counter-clockwise direction. The inner surface 9 of each of the dogs is cut so as to lie in the line of a circle described in the hexagonal nut and the end walls 10 are cut at an acute angle to the respective contiguous sides of the nut, clearly shown in Fig. 3.

In employing my nut lock for securing fish plates to the ends of railroad rails, I employ a washer 11, which is substantially circular in form and forms a part of plate 12, which is of a height equal to the height of the web of the railway rail with which it is associated, so that said plate may be snugly fitted between the tread and base of the rail and thus anchor the washer in place. The washer 11 is provided with a resilient tongue 13 extending from the side thereof, and its locking edge 14 is on a plane coinciding with that of the inner face or shoulder 10 of the contiguous dog 7. The tongue 13 is also provided with an inclined groove 15, so that when the nut is being turned into position the locking dogs may easily ride upon the tongue and be forced therebeyond by forcing the tongue to yield.

The plate 12 is provided with an arcuate groove 16, which is concentric with the washer, so that the locking dogs of the nut may travel in said groove without interference; while the main body of the nut becomes firmly seated on the washer.

In employing my invention, a bolt 17 is inserted through the web of a rail and, when ready to be secured in position, the washer 11 is placed thereon so that the plate 12 fits between the tread and base flange of the rail. The nut 6 is then turned upon the bolt and while the locking dogs 7 pass beyond the tongue 13 while the lugs 17' prevent the bolt from turning. As the nut is being tightened to its final position the inclined surfaces 8 of the respective locking dogs will travel through the inclined groove 15 and over the locking tongue, so that the said locking tongue will be depressed or yield, thus permitting the locking dogs to be easily moved beyond said tongue. When said nut has been completely turned into position it will be seen that one of the locking dogs will have its surface 10 seated against the locking tongue, thus preventing rotation of said nut in the opposite direction and effectually locking said nut in place upon the bolt.

Having thus described my invention further description is deemed unnecessary.

What I claim as new is:

1. In a nut lock adapted for securing railway rails, a plate comprising an anchor member adapted to be fitted snugly between the head and flange of a rail and having a washer formed integrally therewith and an arcuate groove concentric with the washer and a resilient tongue extending from the washer, a polygonal nut having its minor external diameter substantially equal to that of the washer and its apexes extending over the said groove and over the said tongue where the body of the nut is seated on the washer, said nut having a dog extending from each apex of the nut and parallel to the bolt opening in the nut, said groove being of sufficient depth to receive said dogs, so that the said dogs may travel in said groove and said tongue may engage with one of the said dogs for locking the nut.

2. In a nut lock, a plate comprising a washer and an anchoring element and having an arcuate groove concentric with the washer, a resilient tongue extending from the washer, a nut adapted to be firmly seated on the washer, concentric therewith and having a plurality of dogs formed thereon and extending into said arcuate groove and adapted to travel in said groove without interference, each of said dogs having an inclined surface, and having a shoulder at an acute angle to the inclined surface, said shoulder being adapted to depress said resilient tongue, and said resilient tongue being adapted to engage with said shoulder for locking the nut in fixed position on the plate.

3. In combination with a nut having a plurality of dogs extending parallel to the bolt-opening in the nut, a plate consisting of an anchoring member and a washer and having a groove between the anchoring member and the washer and a resilient tongue extending outwardly from the washer, said nut having its body firmly seated on the washer and having its dogs extending into the groove and adapted to travel uninterruptedly therein when the nut is turned, each of said dogs having an inclined surface for depressing the resilient tongue and having a shoulder for locking engagement with said tongue.

In testimony whereof I have signed my name to this specification in the presence of two subscribing witnesses.

FRANK SMITH.

Witnesses:
B. B. RACIR,
E. W. QUICK.

---

Copies of this patent may be obtained for five cents each, by addressing the " Commissioner of Patents, Washington, D. C."